(12) United States Patent
Krass et al.

(10) Patent No.: US 6,606,778 B1
(45) Date of Patent: Aug. 19, 2003

(54) METHOD OF INSTALLING A WINDSHEILD

(75) Inventors: Craig R. Krass, Rockford, IL (US); Esteban Garcia, Kansasville, WI (US); Craig A. Johnson, Rockford, IL (US); Donald Vaughn, Roscoe, IL (US); David A Montalvo, Highland, IN (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 174 days.

(21) Appl. No.: 09/588,886

(22) Filed: Jun. 7, 2000

(51) Int. Cl.[7] .................................................. B23Q 3/00
(52) U.S. Cl. ........................ 29/468; 29/464; 29/462; 296/96.21; 296/201
(58) Field of Search .................... 29/464, 466, 467, 29/468, 281.1, 256, 238, 239, 462; 296/96.21, 201; 156/108, 71; 269/66, 138, 196; 52/208, 204.65, 365, 203, 202, 204.591

(56) References Cited

U.S. PATENT DOCUMENTS

| | | | | |
|---|---|---|---|---|
| 2,014,535 A | * | 9/1935 | Maca ........................... 29/462 |
| 2,089,282 A | * | 8/1937 | Macauley ................... 296/96.2 |
| 2,919,155 A | * | 12/1959 | Williams et al. ........... 296/96.2 |
| 3,601,386 A | | 8/1971 | Estep |
| 3,620,524 A | * | 11/1971 | Czompi ......................... 269/31 |
| 4,199,852 A | * | 4/1980 | Ayers et al. .................. 29/239 |
| 4,208,229 A | * | 6/1980 | Giardini ........................ 156/94 |
| 4,315,447 A | | 2/1982 | Tartaglia et al. |
| 4,344,215 A | | 8/1982 | Dearman |
| 4,386,543 A | | 6/1983 | Walker, Jr. |
| 4,453,303 A | * | 6/1984 | Leddet ......................... 29/407 |
| 4,561,689 A | * | 12/1985 | Sprenger .................. 296/96.21 |
| 4,581,276 A | * | 4/1986 | Kunert et al. ............... 156/108 |
| 4,643,477 A | * | 2/1987 | Kovatch ................... 296/96.21 |
| 4,716,899 A | | 1/1988 | Huenefeld et al. |
| 5,013,077 A | * | 5/1991 | Stevens .................... 296/96.21 |
| 5,050,466 A | | 9/1991 | Cameron |
| D321,118 S | | 10/1991 | Patten |
| 5,069,012 A | * | 12/1991 | Riederer ....................... 296/93 |
| 5,308,135 A | * | 5/1994 | Stedman .................. 296/96.21 |
| 5,472,168 A | * | 12/1995 | Tapp ........................... 264/220 |
| 5,479,689 A | * | 1/1996 | Schmit et al. .............. 29/426.4 |
| 5,655,343 A | * | 8/1997 | Seals ........................... 52/217 |
| 5,772,823 A | * | 6/1998 | Rusch et al. ................ 156/108 |
| 5,938,267 A | * | 8/1999 | Schurig ..................... 296/96.2 |
| 5,956,833 A | * | 9/1999 | Davis et al. .............. 296/96.21 |
| 6,042,670 A | * | 3/2000 | Kuribayashi et al. ....... 156/108 |

* cited by examiner

Primary Examiner—Gregory Vidovich
Assistant Examiner—Marc Jimenez
(74) Attorney, Agent, or Firm—Edwin W. Bacon, Jr.

(57) ABSTRACT

A windshield can be installed in a centered position on a frontal surface of an automotive vehicle body by temporarily clamping two upstanding guides to side edge areas of the vehicle body. When the windshield is lowered onto the frontal surface of the vehicle body the facing surfaces on the upstanding guides will cam the windshield into a centered position on the frontal surface.

3 Claims, 3 Drawing Sheets

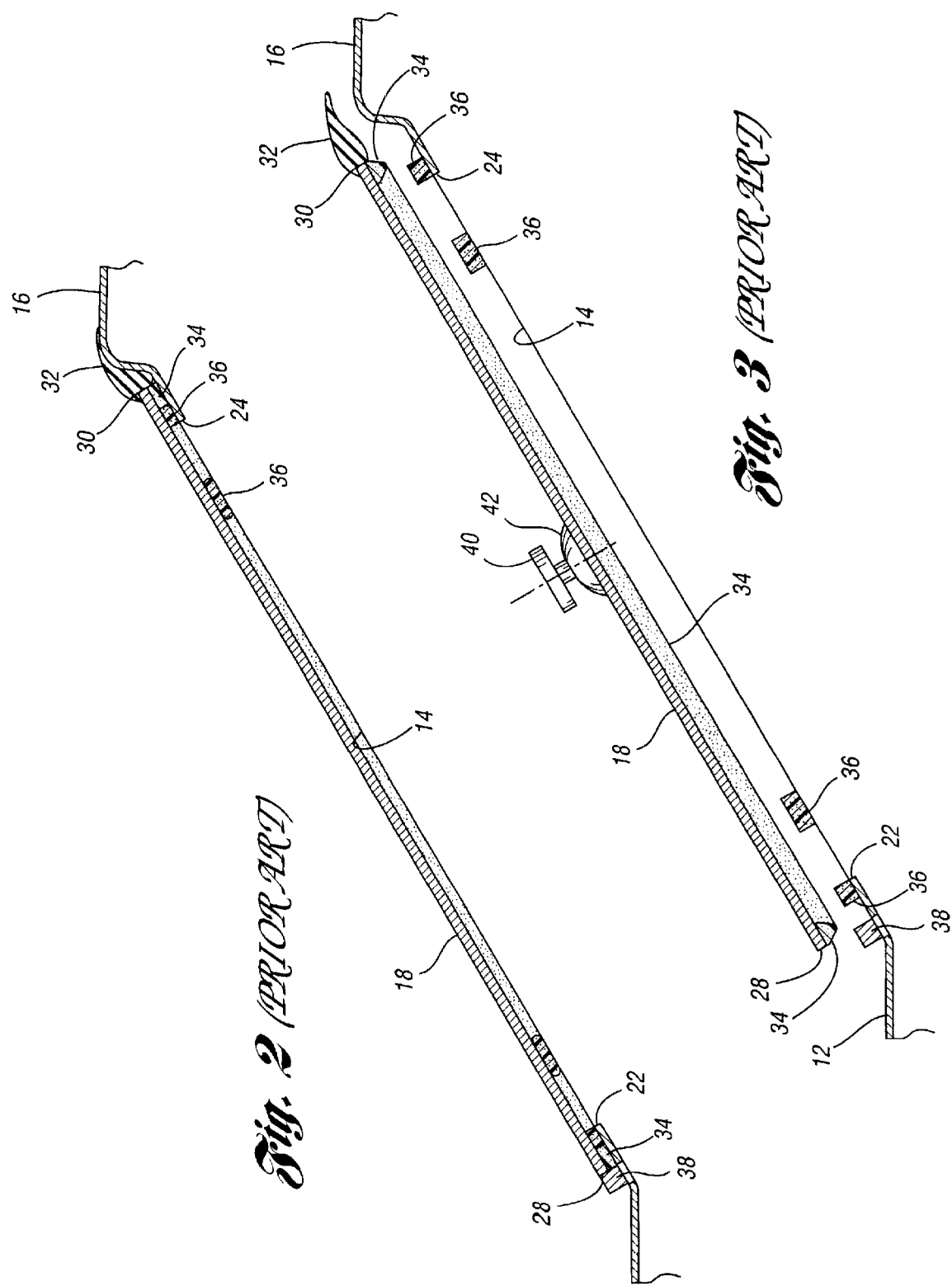

METHOD OF INSTALLING A WINDSHEILD

BACKGROUND AND SUMMARY OF THE INVENTION

This invention relates to a method of installing a front windshield on an automotive vehicle body. The method includes the step of positioning two guides on a frontal surface of the vehicle body so that when the windshield is lowered onto the frontal surface the windshield is centered relative to the side edges of the frontal surface.

Under conventional practice in the automotive vehicle manufacturing industry, the front windshields are installed on the associated vehicle bodies by lowering the windshield onto a frontal surface of the vehicle body so that the windshield is in a centered position on the frontal surface. After installation of the windshield an exterior trim panel and weatherstrip are installed on the frontal surface along each side edge of the windshield.

If the windshield is off center relative to the side edges of the frontal surface it may not be possible to properly install the exterior trim panel and weatherstrip at one (or both) edge of the windshield. In extreme cases it may be necessary to remove the windshield and repeat the windshield installation process.

The present invention relates to a method of installing a windshield on a frontal surface of a vehicle body, wherein the method includes the step of positioning two guides along the side edges of the frontal surface. When the windshield is lowered onto the vehicle body frontal surface the guides will automatically guide the windshield to a centered position on the frontal surface; i.e. both side edges of the windshield will be spaced the same distance from the respective side edges of the frontal surface.

In preferred practice of the invention the guides are adjustable to compensate for manufacturing variations in the edge-to-edge dimension of the vehicle body frontal surface.

The method of the present invention is advantageous in that the windshield is automatically installed in a centered position on the vehicle body frontal surface, such that areas of the frontal surface along the side edges of the windshield are suitably dimensioned to receive exterior trim panels and weatherstrip elements.

Specific features of the invention will be apparent from the attached drawings and description of an apparatus that can be used to practice the improved method.

BRIEF DESCRIPTION OF THE DRAWINGS

FIG. 2 is a fragmentary sectional view taken on line 2—2 in FIG. 1.

FIG. 3 is a view taken in the same direction as FIG. 2, but showing the front windshield prior to its being lowered onto the frontal surface of the vehicle body.

DESCRIPTION OF A PREFERRED EMBODIMENT OF THE INVENTION

Figure 1:
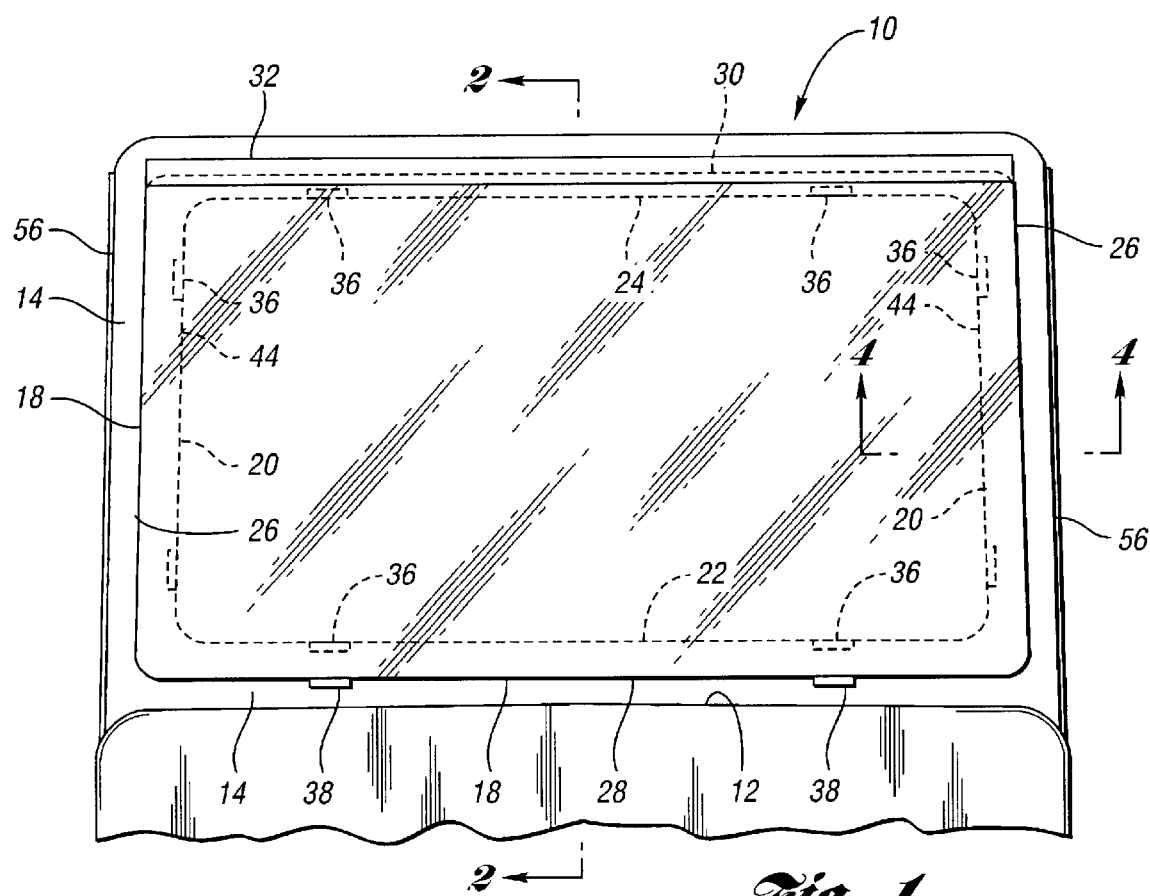
FIG. 1 is a fragmentary front view of an automotive vehicle body having a front windshield that can be installed, using the method of the present invention.

Referring to FIGS. 1 through 3 of the drawings, there is fragmentarily shown an automotive vehicle body 10 having a front hood 12 and an upper frontal surface 14 connected to a roof surface 16. As shown in FIGS. 2 and 3, frontal surface 14 is inclined in a front-to-rear direction to mount a front windshield 18. The windshield is commonly formed of safety glass. The vehicle body is typically formed of steel.

As shown in FIG. 1, frontal surface 14 has a generally rectangular opening therein defined by two side edges 20, a lower edge 22, and an upper edge 24. Windshield 18 is slightly larger than the opening in frontal surface 14, so that the windshield can fit against surface 14 with a desired overlap along the windshield perimeter surface. The windshield has two side edges 26, a lower edge 28, and an upper edge 30. As shown in FIG. 3, a weatherstrip 32 is secured to the upper edge of the windshield prior to installation of the windshield onto frontal surface 14.

Before installation of the windshield on surface 14 a bead of adhesive sealant (usually a viscous flowable urethane material) is applied to the windshield undersurface proximate to the four edges 26, 26, 28 and 30. In the drawing the adhesive sealant is referenced by numeral 34.

To prevent the adhesive from being squeezed out of the sealing interface between the windshield and frontal surface 14, a number of foam rubber spacers 36 are adhered to surface 14 (before installation of the windshield). Also, two stops 38 are fastened to surface 14 near the lower edge 22 of the opening to prevent the windshield from the sliding forward from the FIG. 2 position.

Installation of the windshield is accomplished by lowering the windshield down onto frontal surface 14 form the FIG. 3 position to the FIG. 2 position. The adhesive 34 is pressurized to form a peripheral bond between the windshield and frontal surface 14. During the windshield lowering operation the windshield can be suspended from an overhead support fixture 40 by means of plural suction cups 42 carried by the fixture.

Figure 4:
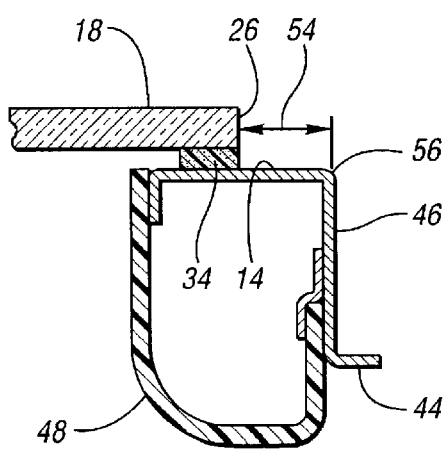
FIG. 4 is a fragmentary sectional view taken on line 4—4 in FIG. 1.

Frontal surface 14 is defined partly by two front pillars 44 having the cross section depicted generally in FIG. 4. As shown in FIG. 4, the pillar includes a metal frame member 46 (extending between the vehicle roof and hood) and an interior molded trim panel 48 fastened to member 46. FIG. 4 shows a cross sectional view of the pillar at one particular point along the pillar length; the pillar cross section can vary from the roof area to the hood area, due to styling factors associated with panel 48.

Figure 5:
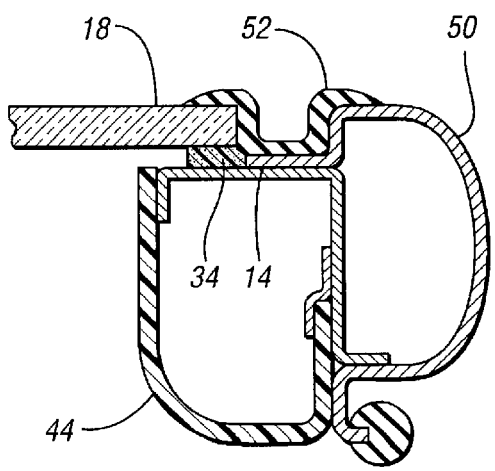
FIG. 5 is a view taken in the same direction as FIG. 4, but showing the windshield and vehicle surface after installation of an exterior trim panel and weatherstrip on the vehicle body frontal surface.

After the windshield has been installed onto frontal surface 14, an ornamental exterior trim panel 50 is fastened to each pillar 44, as shown in FIG. 5. Also, a weatherstrip 52 is secured to the pillar in the space between the side edge of windshield 18 and the upper edge of trim panel 50. The construction depicted in FIG. 5 is duplicated at the other front pillar.

It can be seen from FIGS. 4 and 5 that a proper installation of trim panel 50 and weatherstrip 52 requires a relatively close tolerance on the spatial dimension 54 between the side edge 26 of the windshield and the side edge 56 of frontal surface 14. Maintaining dimension 54 within the necessary tolerance requires that the windshield be centered relative to side edges 56 of frontal surface 14. Unfortunately, the operation of lowering the windshield onto surface 14 (as depicted in FIGS. 2 and 3) is sometimes carried out so that the windshield is not perfectly centered relative to side edges 56; i.e. one dimension 54 will be larger than optimum, while the other dimension 54 will be less than optimum.

Figure 6:
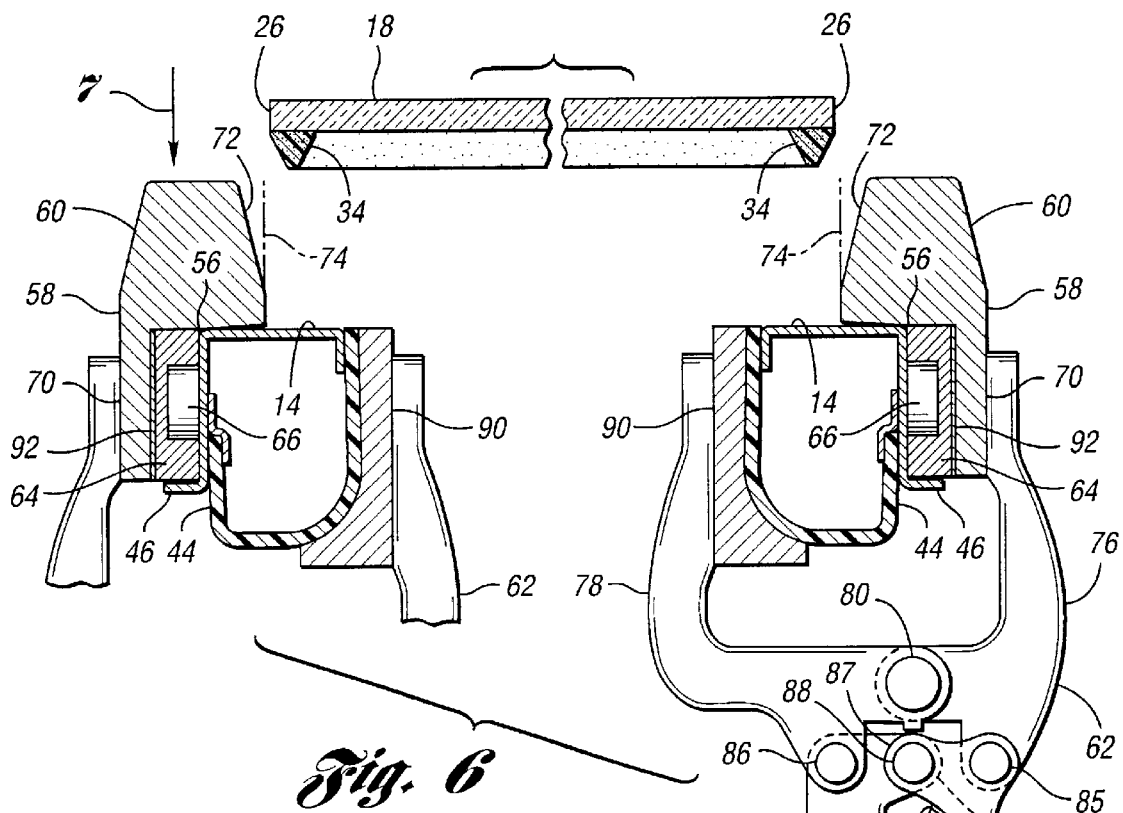
FIG. 6 is a sectional view taken in the same direction as FIG. 4, but showing two guide structures clamped to the vehicle body according to the present invention.

The present invention is concerned primarily with the employment of temporary guides on the two front pillars 44 for insuring that windshield 18 is installed on frontal surface 14 so that dimension 54 is the same along both side edges of the windshield. FIG. 6 shows guide structures that can be used in practice of the invention. Two similarly-constructed guide structures 58 are used, one on each front pillar 44.

Figure 7:
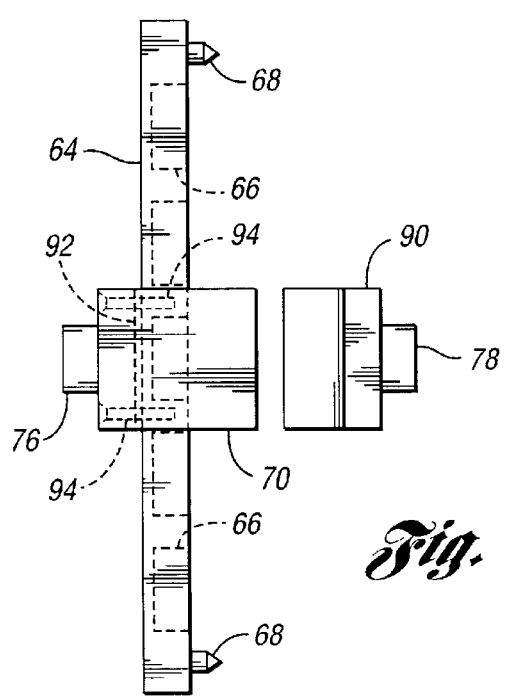
FIG. 7 is a fragmentary plan view of one of the guide structures depicted in FIG. 6, taken in the direction of arrow 7 in FIG. 6.

Each guide structure 58 can include a guide body 60 adapted to assume a fixed position on an associated pillar 44, and a manual clamp mechanism 62 for retaining the guide body in its designated position on the pillar. Guide body 60 includes an elongated rectangular bar 64 having five permanent magnets 66 secured thereon at spaced points along the bar length (as shown in FIG. 7). Bar 64 is preferably formed of a non-magnetic material.

When bar 64 is positioned against a side surface of pillar frame member 46, as shown in FIG. 6, the magnets will hold the bar in a fixed (non-wobble) condition on the steel frame member. The bar is equipped with two locator pins 68 near the bar ends (as shown in FIG. 7), whereby the bar can be positioned at a fixed location along the length of pillar 44. The pillar has two spaced openings in its outer side surface for receiving the locator pins 68.

Guide body 60 further includes an L-shaped member 70 secured to bar 64 at a central point along the bar length (as depicted in FIG. 7). Member 70 has an upstanding cam surface 72 that is angled at a slight angle to an imaginary line 74 normal to frontal surface, 14 when the guide body is positioned on pillar.44 (as shown in FIG. 6). When the windshield is in the process of being lowered onto frontal surface 14, as depicted in FIG. 6, the facing cam surfaces 72 on the respective guide bodies guide the windshield to a centered position on surface 14. In this regard, the term "centered position" means a windshield position wherein both side edges 26 of the windshield are the same distance from the associated side edge 56 of frontal surface 14.

Clamp mechanism 62 for each guide structure can take various forms. As shown in FIG. 6, the clamp mechanism includes two separate arms 76 and 78 swingably connected together by a pivot 80. Handles 82, 84 are pivotably connected to arms 76 and 78 by pivots 85 and 86. Ears 87 on the handles are interconnected by a pivot 88, so that when the handles are squeezed together ears 87 exert an upward force on pivot 80, thereby opening arms 76 and 78. A coil spring associated with pivot 80 can be used to normally bias arms 76 and 78 to the closed position. As previously noted, the clamp mechanism can take various forms.

Clamp arm 76 is connected to L-shaped member 70 by any suitable means, e.g. an adhesive or screws. Clamp arm 78 is connected to a gripper 90 that has a contoured surface conforming to the curvature of the interior trim member 48 of pillar 44;

The two guide structures 58 are similarly constructed so that when the guide structures are installed on pillars 44 the spatial dimension 54 (FIG. 4) at each side edge of the windshield is the same. The aim is to ensure a properly dimensioned exposed frontal surface 14 for proper installation of weatherstrip 52 and exterior trim member 50.

Manufacturing tolerances on the vehicle body are such that the spacing between the side edges 56, 56 of frontal surface 14 may not be entirely uniform, from one vehicle body to another vehicle body. Such non-uniformity can adversely affect the value of dimension 54 (FIG. 4). A relatively narrow vehicle width will tend to reduce the value of dimension 54, whereas a relatively wide vehicle width will tend to increase the value of dimension 54.

To at least partially compensate for variations in vehicle body width, the guide structures 58 are designed so that when the guide structures are clamped to pillars 44 the facing cam surfaces 72 are adjustable, toward or away from the associated edges 56 on frontal surface 14. Slight adjustments in the locations of cam surfaces 72 can be achieved by the selective employment of shims 92 between each elongated bar 64 and the associated L-shaped member 70. Screws 94 can be used to releasably secure bar 64, shim 92, and L-shaped member 70 together, as shown in FIG. 7.

When the shims are used, both guide structures 58 will be equipped with shims (of the same thickness), so that the windshield is better enabled to assume a centered condition relative to side edges 56, 56 of frontal surface 14. The aim is to ensure that dimension 54 at each edge of the windshield comes as close as possible to the optimum value for installation of weatherstrip 52 and exterior trim panel 50, in spite of manufacturing tolerances associated with vehicle body manufacture.

In a production environment, guide structures 58 equipped with shims and guides 58 without shims can be used interchangeably. When a windshield is to be installed on a marginally narrow vehicle body, the guides 58 without shims can be used. When a windshield is to be installed on a marginally wider vehicle body, guide structures 58 equipped with shims will be used.

The invention relates generally to a method of installing a windshield on the frontal surface of a vehicle body, wherein guides are positioned along the side edges of the frontal surface, so that when the windshield is lowered onto the frontal surface the windshield will be centered with respect to the side edges of the frontal surface.

What is claimed:

1. A method of installing a windshield on a frontal surface of an automotive vehicle body, wherein said frontal surface is defined partly by two front pillars bounding two side edges and an opening that is to be covered by the windshield, said method comprising:

(a) clamping a temporary guide to each front pillar on the vehicle body at predetermined distances from frontal surface side edges and magnetically clamping each temporary guide to a front pillar on the vehicle body, the magnetic clamping preventing rotation of each temporary guide in relation to its associated front pillar, (b) lowering the windshield onto the frontal surface of the vehicle body so that side edges of the windshield have edge engagement with said temporary guides, whereby the windshield is oriented with respect to the side edges of said frontal surface, and (c) unclamping said temporary guides from the front pillars after lowering the windshield onto the frontal surface of the vehicle body.

2. A method of installing a windshield on a frontal surface of an automotive vehicle body, wherein said frontal surface is defined partly by two front pillars bounding two side edges and an opening that is to be covered by the windshield, said method comprising:

(a) clamping a temporary guide to each front pillar on the vehicle body at predetermined distances from frontal surface side edges and selectively placing shims between each temporary guide and an associated bar adjusting the position of each temporary guide relative to its associated pillar, (b) lowering the windshield onto the frontal surface of the vehicle body so that side edges of the windshield have edge engagement with said temporary guides, whereby the windshield is oriented with respect to the side edges of said frontal surface, and (c) unclamping said temporary guides from the front pillars after lowering the windshield onto the frontal surface of the vehicle body.

3. A method of installing a windshield on a frontal surface of an automotive body, wherein said body includes two front pillars that form the side edges of the frontal surface, said method comprising:

(a) clamping two temporary guides to the respective pillars so that facing surfaces of the temporary guides are spaced predetermined distances from the side edges of the frontal surface and selectively placing shims between each temporary guide and an associated bar for adjusting the spacing between the guide-facing surfaces and the side edges of said frontal surface so that the windshield is centered on the frontal surface irrespective of variations in spacing between the frontal surface side edges, (b) lowering the windshield onto the frontal surface of the vehicle body so that side edges of the windshield are guided by the facing surfaces of the temporary guides, whereby the windshield is oriented with respect to the side edges of the frontal surface, and (c) unclamping said temporary guides from the front pillars after lowering the windshield onto the frontal surface of the vehicle body.

\* \* \* \* \*